United States Patent
Liang

(10) Patent No.: US 6,625,282 B2
(45) Date of Patent: Sep. 23, 2003

(54) HAND FREE TELEPHONE PICKING UP DEVICE

(75) Inventor: Wen-Kuang Liang, Taoyuan (TW)

(73) Assignee: Projye International Co., Ltd., Taoyuan (TW)

(*) Notice: Subject to any disclaimer, the term of this patent is extended or adjusted under 35 U.S.C. 154(b) by 427 days.

(21) Appl. No.: 09/733,977

(22) Filed: Dec. 12, 2000

(65) Prior Publication Data

US 2002/0071549 A1 Jun. 13, 2002

(51) Int. Cl.[7] ................................. H04M 1/00
(52) U.S. Cl. ..................... 379/428.02; 430/420.04
(58) Field of Search ................. 379/420.04, 430, 379/428.02, 454, 447, 455, 446; 455/568, 569

(56) References Cited

U.S. PATENT DOCUMENTS 6,009,166 A * 12/1999 Polito et al. ............ 379/428.02
6,141,418 A * 10/2000 Weiser et al. ................ 379/454

FOREIGN PATENT DOCUMENTS

EP    0680188 A2 * 11/1995  ............ 379/428.02

* cited by examiner

Primary Examiner—Jack Chiang
(74) Attorney, Agent, or Firm—Rosenberg, Klein & Lee

(57) ABSTRACT

A device for allowing a user to pick up a telephone handset without using his or her hands is disclosed. The device includes a control unit having a control circuit arranged inside a casing. The control circuit is connected between a telephone and a handset of the telephone. A first activation key is provided on the control unit for allowing signal received by the telephone to be passed to the handset so as to allow the user to answer a phone call by hand picking up the handset. The control unit has a signal receiving/transmitting device which is coupled, via electromagnetic waves, to a counterpart receiving/transmitting device arranged in a headset. A second activation key is formed on the headset whereby the user may actuate the second activation key for allowing signals received by the telephone to be passed to the headset. A handset raising device including a solenoid is electrically coupled to the control unit whereby when the second activation key is actuated, the solenoid raises the handset to allow signals to be received by the telephone and then transmitted to the headset.

8 Claims, 3 Drawing Sheets

US 6,625,282 B2

HAND FREE TELEPHONE PICKING UP DEVICE

FIELD OF THE INVENTION

The present invention generally relates to a device for allowing a telephone user to selectively answer a phone call without picking up the handset of the telephone.

BACKGROUND OF THE INVENTION

A regular desktop telephone as shown in FIG. 3 of the attached drawings comprises a telephone body 10 and a handset 11 removably received in a cradle formed in the telephone body 10. A cable 14 connects the handset 11 to the telephone body 10. The telephone is connected to a public exchange station by a subscriber line 13 whereby a signal may be transmitted from the public exchange station to the telephone. A user may answer a phone call by picking up the handset 11. This action requires using the user's hand. This may cause certain problems if the user is using both his or her in for example operating a computer.

It is thus desirable to provide a device for allowing a user to answer a phone call without hand holding a handset of a telephone so as to overcome the problems mentioned above.

SUMMARY OF THE INVENTION

Accordingly, an object of the present invention is to provide a hand free telephone picking up device which allows a user to answer a phone call without picking up the handset with hands.

Another object of the present invention is to provide a device which allows a user to selectively answering a phone call by hand picking up the handset or by using a headset.

A further object of the present invention is to provide a hand free telephone picking up device which allows general consumers to install with a regular telephone without factory modification of the telephone.

To achieve the above objects, in accordance with the present invention, there is provided a hand free telephone picking up device for allowing a user to pick up a telephone handset without using his or her hands is disclosed. The hand free telephone picking up device comprises a control unit having a control circuit arranged inside a casing. The control circuit is connected between a telephone and a handset of the telephone. A first activation key is provided on the control unit for allowing signal received by the telephone to be passed to the handset so as to allow the user to answer a phone call by hand picking up the handset. The control unit has a signal receiving/transmitting device which is coupled, via electromagnetic waves, to a counterpart receiving/transmitting device arranged in a headset. A second activation key is formed on the headset whereby the user may actuate the second activation key for allowing signals received by the telephone to be passed to the headset. A handset raising device comprising a solenoid is electrically coupled to the control unit whereby when the second activation key is actuated, the solenoid raises the handset to allow signals to be received by the telephone and then transmitted to the headset.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
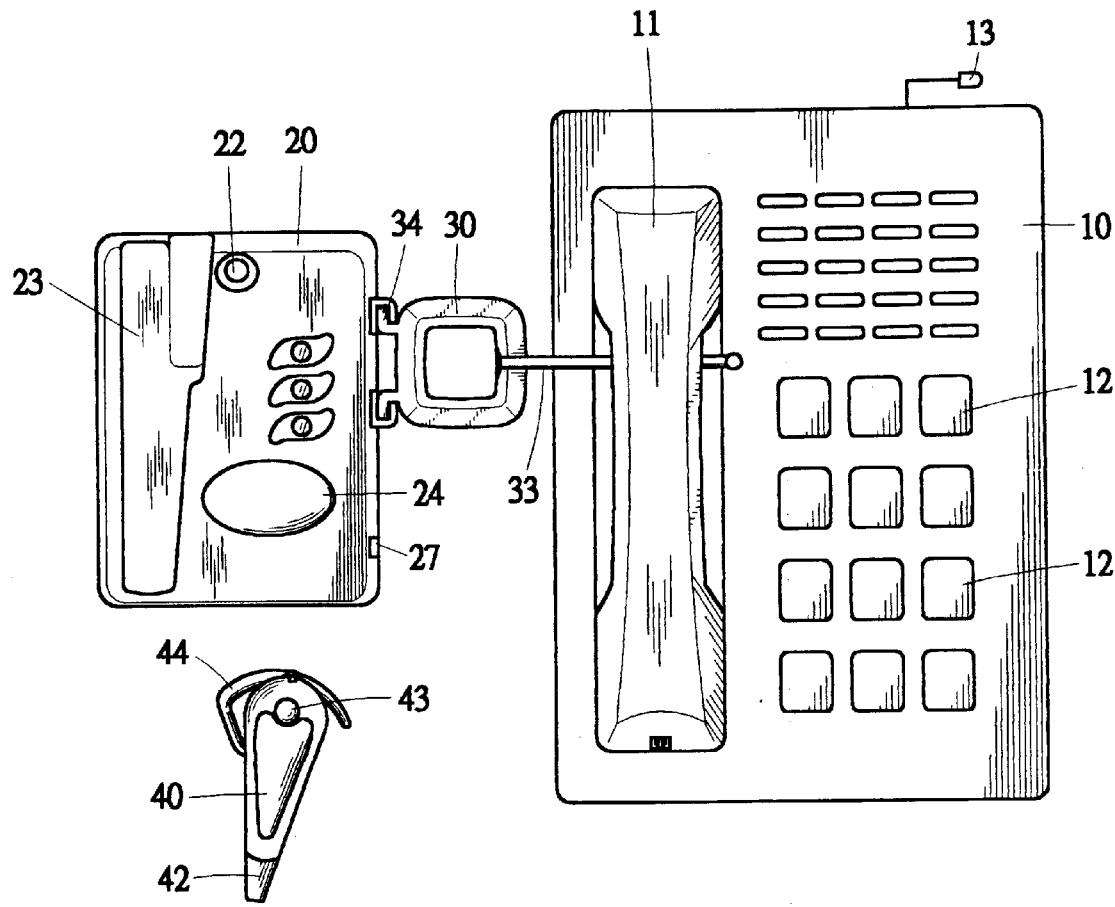
FIG. 1 is a schematic view showing a telephone with a hand free telephone picking up device in accordance with the present invention mounted thereto, cables connected between the telephone and the hand free telephone picking up device being omitted for simplicity.
Figure 4:
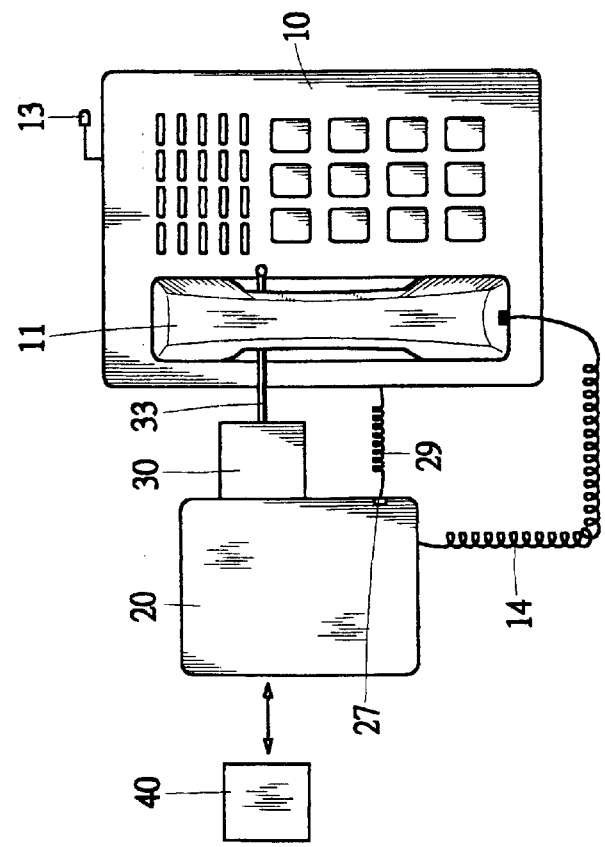
FIG. 4 is schematic view showing the hand free telephone picking up device of the present invention and the telephone.

With reference to the drawings and in particular to FIGS. 1 and 4, a hand free telephone picking up device constructed in accordance with the present invention is adapted to be coupled to a regular desktop telephone that receives a phone call and associated signals from a public exchange station via a subscriber line for allowing a user to selectively answer a phone call by either picking up the handset of the telephone as is conventionally done or activating and using a headset. The hand free telephone picking up device of the present invention comprises a control unit 20, a handset raising device 30 and a wireless headset 40. The control unit 20 comprises a casing (not labeled) inside which a circuit is arranged. The circuit is connected to a telephone 10 by means of cables 14, 29, allowing signals received by the telephone 10 from a public exchange station to be transmitted to the control unit 20.

With reference to FIGS. 1, 2, 4 and 5, the circuit inside the casing of the control unit 20 comprises first transmitting/receiving means 21, such as a blue tooth-based transmitter/receiver. An antenna 22 is mounted on a top face of the casing of the control device 20 and in electrical connection with the first transmitting/receiving means 21.

The casing of the control unit 20 forms a receiving/charging slot 23 for receiving and selectively charging the wireless headset 40. A first activation key 24 is mounted on the casing of the control unit 20. Indicators 25, such as LEDs, are mounted on the casing for indicating the operation status of the hand free telephone picking up device of the present invention. A first electrical socket 26 is formed on the casing of the control unit 20 to which a plug (not shown) formed on an end of the cable 14 is removably received for connection of the cable 14 to the transmitting/receiving means 21 of the control unit 20. Another end of the cable 14 is connected to the handset 11 of the telephone 10. A second electrical socket 27 is formed on the casing of the control unit 20 to which a plug formed on an end of the cable 29 is received. The cable 29 has a second end connected to the telephone 10 whereby the control unit 20 is connected between the telephone 10 and the handset 11.

Preferably, the sockets 26, 27 and the associated plugs are the so-called RJ-11 standard socket-plug pairs for allowing an easy engagement and separation of the plug and the sockets so that a user may readily install the hand free telephone picking up device without factory modification of the telephone 10.

In the embodiment illustrated, the control unit 20 is powered by a power source 28 external to the control device 20, such as an electric main. The power is also supplied to the receiving/charging slot 23 to charge the headset 40, if suitable. If desired, an internal power source may be arranged inside the control unit 20. The internal power source may be any suitable power source, such as a battery set or an rechargeable cell which may be charged by the external power source 28.

Figure 2:
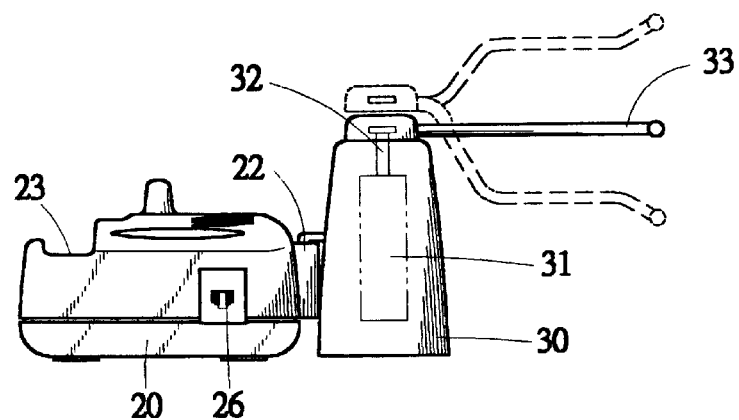
FIG. 2 is a side elevational view of FIG. 1.
Figure 3:
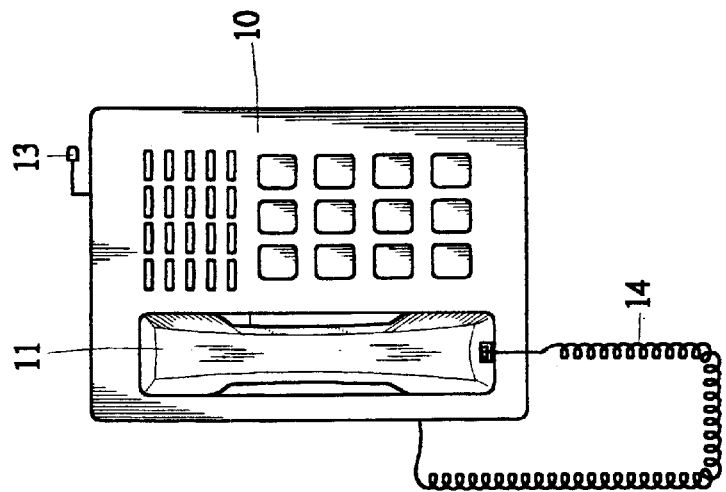
FIG. 3 is a schematic view showing a conventional desktop telephone.

As shown in FIGS. 1 and 2, the handset raising device 30 comprises a hollow base (not labeled) in which solenoid means 31 is fixed. The solenoid means 31 has a push rod 32 movable between a retracted position and an extended position when the solenoid means 31 is actuated. A handset retaining arm 33 made of a deformable material extends from the push rod 32 with a free end thereof retaining the handset 11. The free end of the handset retaining arm 33 is suitably deformed to firmly retain the handset 11 thereon. Dashed lines of FIG. 2 show two deformed conditions of the handset retaining arm 33. The solenoid means 31, once actuated, moves the push rod 32 upwards thereby raising the handset 11 for picking up a phone call to the telephone 10.

In the embodiment illustrated, the control unit 20 and the handset raising device 30 are made separate parts. Connecting elements 34 are formed between the handset raising device 30 and the control unit 20 for releasably attaching the handset raising device 30 to the control unit 20. However, it is apparent to those skilled in the art to combine the handset raising device 30 with the control unit 20 as a single unit whereby no connecting elements 34 are needed and the overall structure is simplified.

Figure 5:
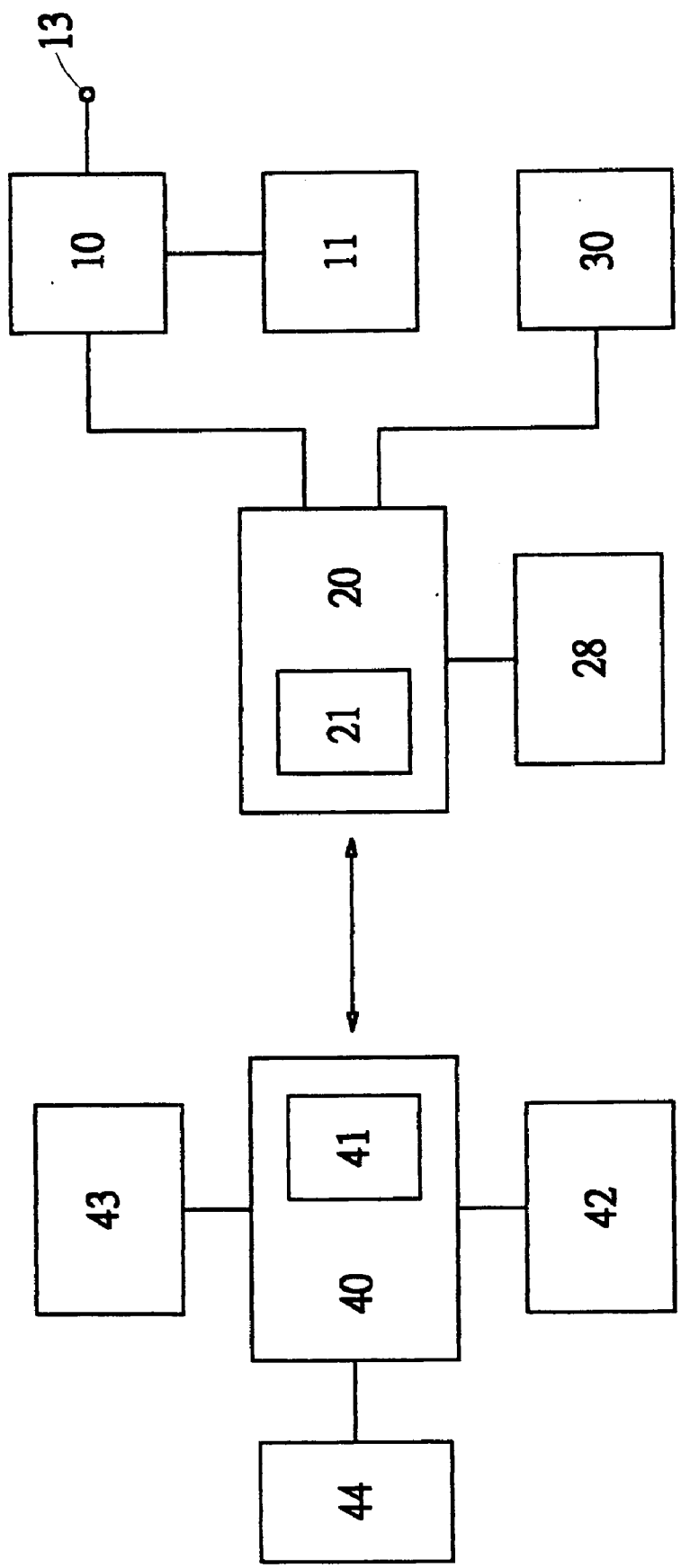
FIG. 5 is a block diagram of the hand free telephone picking up device of the present invention.

As shown in FIGS. 1 and 5, the headset 40 comprises second transmitting/receiving means 41, such as a blue tooth-based transmitted/receiver, arranged inside a casing (not labeled) of the headset 40 for receiving and transmitting signals between the headset 40 and the control unit 20. The second transmitting/receiving means 41 is wirelessly connectable to the first transmitting/receiving means by electromagnetic waves for transmitting signals therebetween. A second activation key 43 is formed on the casing of the headset 40 for user's actuation to answer phone call with the headset 40. A microphone 42 is built in the headset 40 at a suitable position for user's to speak to the headset 40. A holding element 44 is formed on the casing of the headset 40 for securely holding the headset 40 on the head of a user whereby the microphone 42 is positioned close to the mouth of the user. An internal power source (not shown) is built in the headset 40 which may be a battery set or, preferably a rechargeable cell. The headset 40 is configured to be received and retained in the receiving/charging slot 23 of the control device 20. Preferably, corresponding contact pads are formed on both the receiving/charging slot 23 and the headset 40 which engages each other when the headset 40 is received in the receiving/charging slot 23 for charging the rechargeable cell of the headset 40.

In operation, when an incoming call is detected by the telephone 10, the telephone 10 rings. The user may select to answer the phone call by using the handset 11 or the headset 40. If the user selects to use the handset 11, then the first activation key 24 formed on the control unit 20 is actuated. Signal is allowed to pass the control unit 20 to the handset 11. The user may then answer the phone call with the handset 11 as a regular telephone.

If the user selects to answer with the headset 40, the second activation key 43 of the headset 40 is actuated. Signal is then transmitted to the headset 40 via the first and second transmitting/receiving means 21, 41 and the antenna 22. Actuation of the second activation key 43 triggers the solenoid means 31 of the handset raising device 30 to raise the handset 11. This allows the signal received by the telephone 10 to be transmitted to the control unit 20 and is in turn transferred to the headset 40. The headset 40 may be securely held on the head of the user by the holding element 44 thereby freeing the user hands in answering the call.

To terminate the call, the user simply actuates the second activation key 43 again. The solenoid means 31 is de-energized and the handset 11 is lowered down back to the handset cradle of the telephone 10 thereby hanging off the telephone 10.

In accordance with the present invention, the telephone 10 requires no modification to connect to the control unit 20, a user may be allowed to install the hand free telephone picking up device of the present invention by himself or herself without any difficulty.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A hand free telephone picking up device comprising:
   a control unit comprising a circuit arranged inside a casing adapted to be electrically connected between a telephone that receives external signals from a telephone line and a handset of the telephone, the circuit comprising first transmitting/receiving means, the control unit comprising a handset activation key which when actuated allows the handset to be connected to the telephone via the circuit;
   a headset comprising second transmitting/receiving means selectively and wirelessly connectable to the first transmitting/receiving means for transmitting signals therebetween, the headset comprising a microphone and an earphone and a headset activation key which when actuated allows the second transmitting/receiving means to be wirelessly connected to the first transmitting/receiving means whereby the microphone and the earphone are electrically coupled to the telephone, the headset comprising retaining means adapted to retain the headset on a user head whereby the user may use the microphone and the earphone to speak and listen when the headset activation key is actuated; and
   means for selectively raising the handset of the telephone, the handset raising means being coupled to the control unit whereby when the headset activation key is actuated, the handset raising means is activated to raise and thus pick up the handset for activating the telephone to receive the external signals.

2. The device as claimed in claim 1, wherein the headset comprises a built-in rechargeable power supply.

3. The device as claimed in claim 2, wherein the casing of the control unit defines a recess for receiving the headset therein, contacts being formed in the recess for electrically contacting corresponding contacts formed on the headset for recharging the rechargeable power supply of the headset.

4. The device as claimed in claim 1, wherein the control unit further comprises an antenna for transmitting/receiving signals to/from the headset.

5. The device as claimed in claim 1, wherein the casing of the control unit defines a socket for removably receiving a plug formed on an end of a cable extending from the telephone and a socket for removably receiving a plug formed on an end of a cable extending from the handset, both sockets being in electrical connection with the control circuit.

6. The device as claimed in claim 1, wherein the handset raising means comprises a solenoid having a push rod movable between first and second positions when the solenoid is activated/deactivated.

7. The device as claimed in claim 6, wherein a handset support arm extends from the push rod, the handset support arm being deformable to accommodate the handset so as to firmly supporting the handset thereon.

8. The device as claimed in claim 1 further comprising connecting members to secure the handset raising means to the casing of the control unit.

* * * * *